Nov. 27, 1962 M. D. JENNINGS ET AL 3,065,879
PLANTER SEED WHEEL
Filed Sept. 11, 1959
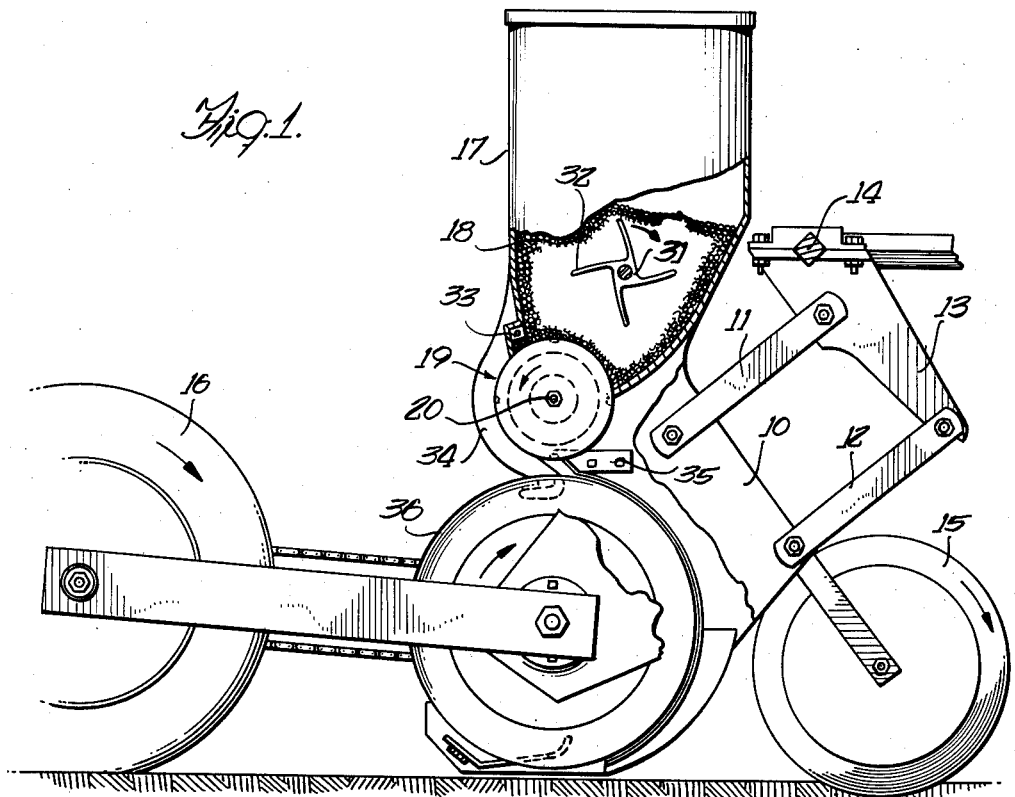
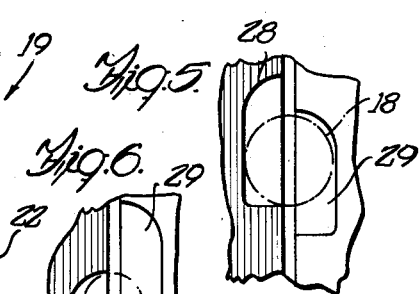
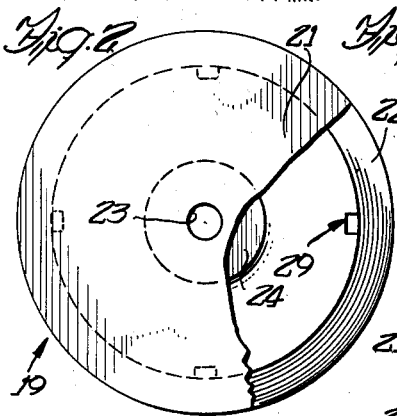
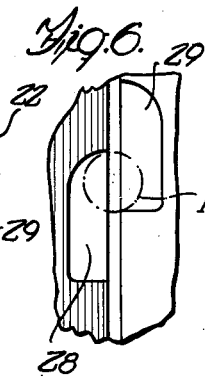
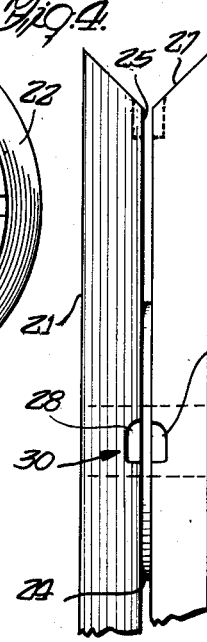
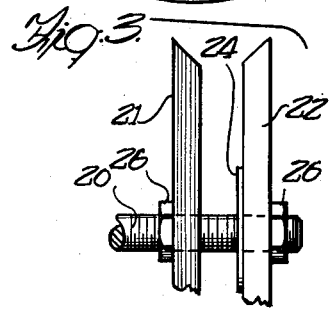
INVENTORS
MARVIN D. JENNINGS
BENJAMIN A. SHADER
ATTORNEY

United States Patent Office 3,065,879
Patented Nov. 27, 1962

3,065,879
PLANTER SEED WHEEL
Marvin D. Jennings, Naperville, and Benjamin A. Shader, Brookfield, Ill., assignors to International Harvester Company, Chicago, Ill., a corporation of New Jersey
Filed Sept. 11, 1959, Ser. No. 839,466
5 Claims. (Cl. 221—233)

This invention relates to planters and particularly to planting apparatus adapted for high speed, precision planting. More specifically, the invention concerns a novel seed wheel of the type having peripherally arranged cells adapted to be revolved in a planter hopper to receive and discharge seed therefrom.

One of the disadvantages of prior seed wheels of this type has been that they must be changed each time a different size of seed was to be planted, in order to provide a wheel having cells of the right size for the seed.

An object of this invention is, therefore, the provision of a novel seed wheel which can be used to plant seed of different sizes.

Another object of the invention is the provision of a seed wheel having peripheral seed cells therein which can be adjusted to accommodate seed of different sizes.

Another object of the invention is the provision, in a planter, of a seed wheel consisting of two parallel parts spaced to provide an annular opening therebetween bisecting the seed cells thereof and relatively circumferentially displaceable to provide a varying amount of overlap of the bisected halves of the seed cells.

Other objects and advantages of the invention will become clear from the following detailed description when read in conjunction with the accompanying drawings wherein:

FIG. 1 is a view in side elevation, partly in section, of a precision planter unit incorporating the features of this invention;

FIG. 2 is an enlarged view of the seed wheel with parts broken away;

FIG. 3 shows in end elevation a portion of the two seed wheel sections which form the wheel shown in FIG. 2;

FIG. 4 is a view in end elevation of a portion of the seed wheel on an enlarged scale and illustrating the registration of the two parts of a seed cell;

FIG. 5 is a detail of the seed cell of FIG. 4 on a larger scale with one section of the cell displaced relative to the other to provide a smaller seed-receiving cell area; and FIG. 6 shows the same seed cell section shown in FIG. 5 displaced in the other direction to provide a smaller cell area to receive a smaller seed.

In the drawings, numeral 10 designates the frame of the planter unit of this invention pivotally connected by a vertically spaced pair of parallel links 11 and 12 to a bracket 13 mounted on a transversely extending tool bar 14 adapted to be carried on a tractor or the like, not shown. The frame 10 is adapted to be supported, in a conventional way, by front and rear wheels 15 and 16.

Mounted on the frame is a seed hopper 17 containing seed 18 and having an opening in the bottom to receive the upper portion of a peripherally celled vertical seed wheel 19 mounted on a shaft 20 carried by the frame 10 and rotatable in the direction of the arrows by means, not shown, such as shown and described in copending U.S. application, Serial No. 839,467, filed September 11, 1959, to which reference may be had also for other constructional details of the planter unit not described herein.

As shown in FIGURE 3, seed wheel 19 is formed of two parallel closely adjacent wheel sections 21 and 22 having axial bores 23 therein adapted to receive the shaft or bolt 20, and wheel section 22 has an axially projecting hub section 24 forming a spacer between the elements 21 and 22 leaving an annular space 25 therebetween. The bolt or shaft 20 by which the wheel 19 is rotatably mounted on the frame, has a portion thereof threaded to receive nuts 26 by which the wheel sections 21 and 22 are secured together to operate as a unit.

As shown in FIGURE 4, the wheel sections 21 and 22 are oppositely peripherally beveled to form a V-shaped channel or peripheral groove 27 and the radially inner peripheral edge of each wheel section is notched to form the complementary parts 28 and 29 of a seed cell 30.

As previously noted, the upper part of seed wheel 19 rotates in the hopper 17 and seed 18 falls into the cells 30. The reception of seed in the cells is facilitated by the provision of a combination seed impelling and agitator member 31 rotatably mounted in the hopper and having arms 32 adapted to impel the seed generally tangentially in the direction of rotation of the wheel 19. A cut-off is provided in the form of a brush indicated at 33, mounted with the hopper and engageable with the periphery of the seed wheel.

A curved retainer member 34 holds the seed in the cells during rotation thereof until the seed is ejected by a knock-out member 35 mounted on the planter frame and having a portion thereof extending into the space 25.

Seed discharged from wheel 19 is received by a guide wheel 36, which forms no part of this invention, and the details of construction of which may be had by a reference to the copending U.S. application above referred to. Suffice it to say that the wheel 36, which revolves in the direction of the arrow shown in FIGURE 1, carries the seed to the ground where it is discharged.

In the position of the parts in FIGURE 4, the sections 28 and 29 of seed cell 30 are in registry to receive a relatively large seed. When a smaller seed is to be planted, the nuts 26 on shaft 20 are loosened to allow separation and circumferential adjustment of the wheel sections 21 and 22 to regulate the amount of overlap of the cell sections 28 and 29, depending upon the size of seed, as illustrated in FIGURES 5 and 6. The wheel sections are then again brought together and secured by the nuts 26.

The operation of the novel seed wheel of this invention should be clearly understood from the foregoing description. It should likewise be understood that the invention has been described in its preferred embodiment and that modifications may be made therein without departing from the spirit of the invention or the scope of the appended claims.

What is claimed is:

1. In a planter, a frame, a seed wheel rotatably mounted on the frame, comprising a pair of independently rotatable wheel elements, a plurality of recesses in the adjacent peripheral surfaces of said wheel elements, each of the recesses in one of said wheel elements being alignable with a recess in the adjacent wheel element to form a seed cell, and releasable holding means securing said wheel elements together, said holding means being releasable to accommodate independent circumferential adjustment of said elements to relatively displace said recesses and vary the size of said seed cell.

2. The invention set forth in claim 1, wherein the opposing faces of said wheel elements are peripherally beveled to form a V-shaped groove with the seed cells in the apex thereof.

3. In a planter, a frame, a seed hopper mounted on the frame, juxtaposed wheel elements independently rotatably mounted on the frame and having their inner peripheral surfaces beveled to form a channel therebetween, registering recesses in said wheel elements forming seed cells in the bottom of said channel to receive seed from the hopper, and means for securing said wheel elements together to revolve as a unitary seed wheel, said means being releasable to accommodate relative circumferential displacement of said wheel elements to vary the area of registration of said recesses and therefore the size of said cells.

4. In a planter, a frame, a seed hopper mounted on the frame, juxtaposed wheel elements independently rotatably mounted on the frame and having their inner peripheral surfaces beveled to form a channel therebetween, registering recesses in said wheel elements forming seed cells in the bottom of said channel to receive seed from the hopper, means for securing said wheel elements together to revolve as a unitary seed wheel, said means accommodating relative circumferential displacement of said wheel elements to vary the area of registration of said recesses and therefore the size of said cells, spacer means extending between said wheel elements providing an annular space between the radially outer portions of said wheel elements, and knock-out means carried by the frame and disposed in said space to engage the seed in said cells after a predetermined rotation of the wheel.

5. A seed wheel for use in a planter, comprising a pair of independently rotatable parallel, disk-like wheel elements each of which includes a hub section and a radially outer seed-engaging section, an axial extension on the hub section of one of said wheel elements engageable with the hub section of the other wheel element to provide a space between the radially outer seed-engaging sections thereof, seed cells formed in the periphery of said wheel, said cells being bisected by said space, releasable holding means securing said wheel elements together, said holding means being releasable to accommodate relative circumferential displacement of said elements.

References Cited in the file of this patent

UNITED STATES PATENTS

| | | |
|---|---|---|
| 768,317 | Smith | Aug. 23, 1904 |
| 2,667,286 | Raught | Jan. 26, 1954 |
| 2,726,026 | Gould et al. | Dec. 6, 1955 |
| 2,797,589 | Michie | July 2, 1957 |
| 2,916,926 | Albertson et al. | Dec. 15, 1959 |